United States Patent
Rosin et al.

[15] 3,673,259
[45] June 27, 1972

[54] PRODUCTION OF AROMATIC SULFONES

[72] Inventors: Jacob Rosin, Maplewood; Frank S. Ang, Kearney, both of N.J.

[73] Assignee: Chris-Craft Industries, Inc.

[22] Filed: Oct. 7, 1968

[21] Appl. No.: 765,594

[52] U.S. Cl. .................................. 260/607 A, 260/543 R
[51] Int. Cl. .................................................. C07c 147/06
[58] Field of Search .............................................. 260/607 A

[56] References Cited

UNITED STATES PATENTS

| | | | |
|---|---|---|---|
| 2,000,061 | 5/1935 | Carr | 260/607 |
| 2,224,964 | 12/1940 | Huismann | 260/607 |

*Primary Examiner*—Lewis Gotts
*Assistant Examiner*—D. R. Phillips
*Attorney*—Pennie, Edmonds, Morton, Taylor and Adams

[57] ABSTRACT

In the production of aromatic sulfones by the condensation reaction of an arylsulfonyl chloride with an arene, practically quantitative yields of the aromatic sulfone are obtained without the usual purification and work-up problems by conducting the condensation reaction in the presence of relatively large amounts (based on the molar concentration of the arylsulfonyl chloride) of the particular arylsulfonic acid which corresponds to such arylsulfonyl chloride, but substantially in the absence of any metal salts. Using in conjunction with this improved method for producing the aromatic sulfone a new and unique technique for producing the arylsulfonyl chloride, which technique is based on chlorinating the aromatic sulfonic acid with chlorosulfonic acid in the presence of certain organic solvents so that equilibrium of such chlorination is displaced toward formation of the resultant arylsulfonyl chloride, an extremely efficient process has been developed for the production of aromatic sulfones.

This process is described in detail in connection with the production of bis-(p-chlorophenyl) sulfone, which is a commercially important monomer in the manufacture of many thermoplastic polysulfone polymers.

5 Claims, 1 Drawing Figure

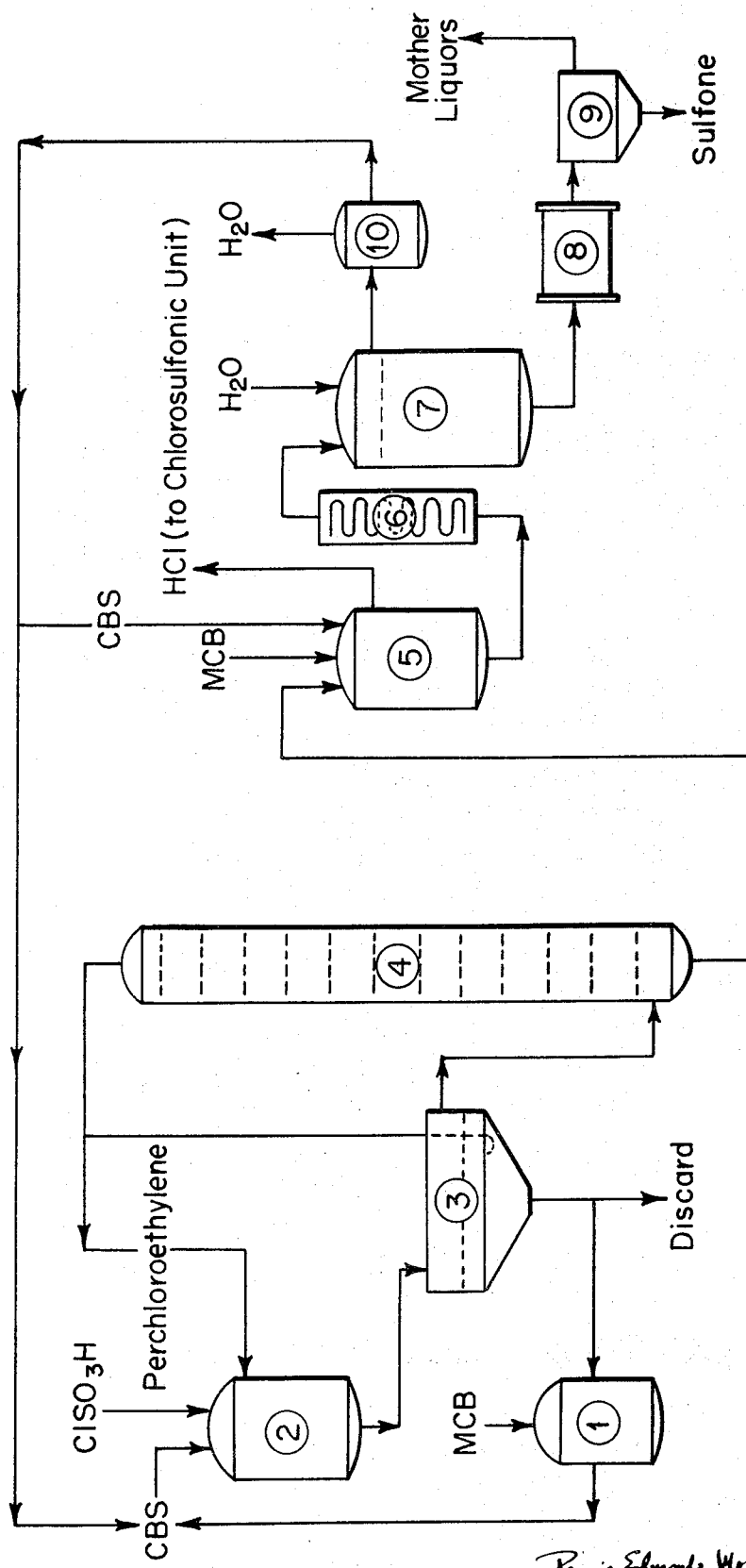

PRODUCTION OF AROMATIC SULFONES

INTRODUCTION

This application relates to the production of aromatic sulfones by the condensation reaction of an arylsulfonyl chloride and an arene. The invention provides an improved process for the production of aromatic sulfones as well as an improved technique for producing the intermediate arylsulfonyl chloride, both of which process improvements have been combined in an extremely efficient integrated process for producing aromatic sulfones. The invention is particularly applicable to the production of bis-(p-chlorophenyl) sulfone.

Bis-(p-chlorophenyl) sulfone, which is a commercially important monomer in the manufacture of many thermoplastic polysulfone polymers, is produced from monochlorobenzene in a sequence of reactions in which (1) monochlorobenzene is sulfonated with sulfuric acid to form p-chlorobenzenesulfonic acid, (2) the p-chlorobenzenesulfonic acid is chlorinated with chlorosulfonic acid to form the corresponding p-chlorobenzenesulfonyl chloride, and (3) the p-chlorobenzenesulfonyl chloride is condensed with monochlorobenzene in the presence of a Friedel-Crafts catalyst (generally aluminum chloride) to form the bis-(p-chlorophenyl) sulfone. The stoichiometry of this reaction sequence is as follows:

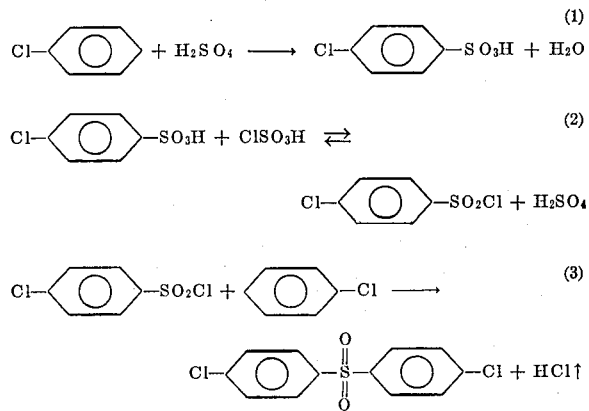

Because the chlorination of p-chlorobenzenesulfonic acid with chlorosulfonic acid reaches an equilibrium between the resultant p-chlorobenzenesulfonyl chloride and sulfuric acid as shown in Equation (2) of the foregoing reaction sequence, a large excess of chlorosulfonic acid is generally used to displace the equilibrium toward formation of p-chlorobenzenesulfonyl chloride, even under which conditions the yields of the arylsulfonyl chloride are less than qunatitative. By way of illustration, the classic method of producing p-chlorobenzenesulfonyl chloride requires 4.13 moles of chlorosulfonic acid per mole of p-chlorobenzenesulfonic acid, yielding only 81 percent of theory of the p-chlorobenzenesulfonyl chloride. Although thionyl chloride or phosphorous trichloride may be used as a chlorination reagent to obtain higher yields of the arylsulfonyl chloride, the much higher costs of these chlorination reagents do not justify their use in favor of the less expensive chlorosulfonic acid.

To produce bis-(p-chlorophenyl) sulfone, the p-chlorobenzenesulfonyl chloride is reacted with an excess of monochlorobenzene in the presence of a Friedel-Crafts catalyst, the most common catalyst being aluminum chloride. Although there is no particular difficulty in conducting this condensation reaction, the use of the usual Friedel-Craft catalysts which are metal salts complicates the work-up and purification of the aromatic sulfone. Because of the relatively high cost of manufacturing p-chlorobenzenesulfonyl chloride and the problems inherent in the work-up and purification of the aromatic sulfone formed when this arylsulfonyl chloride is condensed with monochlorobenzene using metal salts as Friedel-Crafts catalysts, bis-(p-chlorophenyl) sulfone is regarded as somewhat difficult to manufacture economically.

STATEMENT OF THE INVENTION

During an extensive investigation into (1) the chlorination of arylsulfonic acids with chlorosulfonic acid to form the corresponding arylsulfonyl chloride, and (2) the condensation of the resultant arylsulfonyl chloride with an arene to form the corresponding aromatic sulfone, the following two basic discoveries were made:

*Firstly,* when the arylsulfonic acid is reacted with chlorosulfonic acid in the presence of certain solvents (i) which are inert to chlorosulfonic acid and sulfuric acid, (ii) which are substantially non-solvents for and immiscible with sulfuric acid, (iii) which are solvents for the resultant arylsulfonyl chloride, and (iv) which are very limited solvents for the arylsulfonic acid and for chlorosulfonic acid, we found that it is possible to displace the equilibrium of the chlorination reaction toward formation of the arylsulfonyl chloride by substantially completely extracting the arylsulfonyl chloride from the chlorination reaction mixture into the organic solvent. By itself, this process improvement for producing arylsulfonyl chlorides is described and claimed in copending application Ser. No. 765,486, filed Oct. 7, 1968, titled "Production of Arylsulfonyl Chlorides."

*Secondly,* we found that the condensation reaction between the arylsulfonyl chloride and an arene appears to be catalyzed by the presence in the reaction mixture of at least 50 mole percent (based on the molar concentration of the arylsulfonyl chloride) of the particular arylsulfonic acid which corresponds to the arylsulfonyl chloride, that this condensation reaction may be conducted in the absence of any metal salts (i.e., Friedel-Craft catalysts, such as aluminum chloride), and that the use of these reaction conditions yields the aromatic sulfone in high yields and facilitates recovery of the aromatic sulfone from the condensation reaction mixture. On the basis of this discovery alone, the invention contemplates the improvement, in a process for the production of aromatic sulfones, in which an arylsulfonyl chloride is reacted with an arene to form the aromatic sulfone through a condensation reaction, which comprises conducting the condensation reaction (a) in the presence of at least 50 percent of an equimolar quantity, based on the molar concentration of the arylsulfonyl chloride, of the particular arylsulfonic acid which corresponds to such arylsulfonyl chloride, and (b) substantially in the absence of any metal salts, thereby forming the aromatic sulfone in high yields and facilitating subsequent recovery of the aromatic sulfone from the resultant condensation reaction mixture.

Based on using both of these discoveries in conjunction with each other, the invention also provides an improved, economically efficient process for the production of aromatic sulfones which comprises a. chlorinating an arylsulfonic acid with chlorosulfonic acid and displacing the equilibrium of the chlorination reaction toward formation of the arylsulfonyl chloride by substantially completely extracting the arylsulfonyl chloride from the chlorination reaction mixture into an organic solvent (i) which is inert to chlorosulfonic acid and sulfuric acid (ii) which is substantially a non-solvent for and immiscible with sulfuric acid, (iii) which is a solvent for the resultant arylsulfonyl chloride and (iv) which is a very limited solvent for the arylsulfonic acid and for chlorosulfonic acid;

b. separating the chlorination reaction mixture into (i) an organic phase comprising a solution in the organic solvent of the arylsulfonyl chloride and minor amounts of unreacted arylsulfonic acid and unreacted chlorosulfonic acid, and (ii) an inorganic phase comprising essentially sulfuric acid and a minor amount of some unreacted chlorosulfonic acid;

c. recovering the arylsulfonyl chloride and the unreacted arylsulfonic acid from the organic phase and then reacting the resultant arylsulfonyl chloride with at least an equivalent amount of an arene to form the corresponding aromatic sulfone by a condensation reaction, the reaction being conducted (i) in the presence of an aggregate amount of arylsulfonic acid equal to at least 50 mole percent of the amount of arylsulfonyl chloride present in the condensation reaction mixture, and (ii) substantially in the absence of any metal salts, thereby forming the aromatic sulfone in high yields and facilitating the subsequent recovery of the aromatic sulfone from the condensation reaction mixture; and d. recovering the aromatic sulfone from such condensation reaction mixture.

This process may be used to produce a large number of commercially important aromatic sulfones, among which include both the structurally symmetrical and unsymmetrical aromatic sulfones, and is particularly applicable to the production of bis-(p-chlorophenyl) sulfone.

THE BASIC PARAMETERS OF THE PROCESS

For convenience, the basic parameters of the process for producing aromatic sulfones in accordance with the invention are discussed in detail below with respect to the reaction sequence involved in such process, namely (1) the *chlorination reaction*, by which the arylsulfonic acid is chlorinated with chlorosulfonic acid to form the corresponding arylsulfonyl chloride, and (2) the *condensation reaction*, by which the arylsulfonyl chloride is condensed with an arene to form the corresponding aromatic sulfone.

The Chlorination Reaction

The arylsulfonic acid is reacted with chlorosulfonic acid ($ClSO_3H$), preferably in approximately equimolar quantities, and the equilibrium of the chlorination reaction is displaced toward formation of the arylsulfonyl chloride by substantially completely extracting the arylsulfonyl chloride from the chlorination reaction mixture into an organic solvent (i) which is inert to chlorosulfonic acid and sulfuric acid, (ii) which is substantially a non-solvent for and immiscible with sulfuric acid, (iii) which is a solvent for the resultant arylsulfonyl chloride, and (iv) which is a very limited solvent for the arylsulfonic acid and for chlorosulfonic acid. Many organic solvents have been found to meet these four critical criteria, the most important class of which organic solvents are the halogenated hydrocarbons. By far the most efficient organic solvents for displacing the equilibrium of the chlorination reaction toward formation of the arylsulfonyl chloride are those halogenated hydrocarbons having a boiling point which is fairly close to that of chlorosulfonic acid so that both the solvent as well as any unreacted chlorosulfonic acid concurrently extracted from the chlorination reaction mixture may be separated from the arylsulfonyl chloride by distillation. One such halogenated hydrocarbon is perchloroethylene, which readily dissolves the arylsulfonyl chloride but is a poor solvent for the arylsulfonic acid and chlorosulfonic acid and virtually a non-solvent for sulfuric acid. The boiling point of perchloroethylene (b.p. 121° C.) is sufficiently close to that of chlorosulfonic acid (b.p. 158° C.) so that whatever chlorosulfonic acid is extracted by perchloroethylene during the extraction of the arylsulfonyl chloride from the chlorination reaction mixture is ultimately codistilled with the perchloroethylene during recovery of the arylsulfonyl chloride and the distillate (perchloroethylene and chlorosulfonic acid) recycled for reuse in the extraction of further arylsulfonyl chloride from the chlorination reaction mixture.

As a practical matter, the chlorination reaction may be carried out by various techniques depending upon production requirements and the availability of equipment. One such technique involves reacting the arylsulfonic acid and chlorosulfonic acid and then subsequently extracting the chlorination reaction mixture with the organic solvent, which extraction causes the equilibrium of the chlorination reaction to be displaced toward formation of additional arylsulfonyl chloride. Another technique involves conducting the chlorination reaction initially in the presence of the organic solvent so that the arylsulfonyl chloride is selectively extracted from the reaction mixture as quickly as it forms. A more efficient varient of the latter technique involves conducting the chlorination reaction initially in the presence of the organic solvent and also extracting the sulfuric acid phase of the reaction mixture with additional solvent, which extraction is combined with the initially formed organic phase so that the arylsulfonyl chloride is substantially completely extracted into the solvent.

Whatever the technique used, the chlorination of the arylsulfonic acid with chlorosulfonic acid must be conducted in such manner that the equilibrium of the chlorination reaction is displaced toward formation of the arylsulfonyl chloride by substantially completely extracting the arylsulfonyl chloride from the chlorination reaction mixture into the organic solvent and minimizing insofar as possible the coextraction of the arylsulfonic acid and chlorosulfonic acid by the organic solvent. Based on our experience, we have observed that the presence of relatively high concentrations of arylsulfonyl chloride in the organic solvent (such as perchloroethylene) tends to increase the solubility of arylsulfonic acid and of chlorosulfonic acid in such organic solvent. Consequently, the concentration of arylsulfonyl chloride in the organic solvent should be maintained at a relatively low level to minimize coextraction of arylsulfonic acid and chlorosulfonic acid. We found that (a) by continuously adding the chlorination reaction mixture to the "heel" remaining from the prior extraction of another batch (i.e., which "heel" comprises essentially sulfuric acid), (b) by simultaneously continuously introducing the organic solvent into the bottom of this "heel,"(c) by simultaneously continuously removing the upper organic layer from the "heel" and transferring such removed organic solution to an evaporator or distillation tower, and (d) by simultaneously distilling the organic solvent (which necessarily codistills most if not all of the chlorosulfonic acid which may be extracted by the solvent) and using this distillate as the organic solvent which is introduced into the bottom of the "heel," it is possible to maintain a sufficiently low concentration of arylsulfonyl chloride in the organic solvent to minimize the coextraction of arylsulfonic acid and chlorosulfonic acid and to virtually completely suppress the co-extraction of any sulfuric acid by the organic solvent. Under these conditions, the entire chlorination reaction mixture may be separated into (i) an organic phase comprising a solution in the organic solvent of the arylsulfonyl chloride, which solution invariably contains some unreacted arylsulfonic acid and probably contains some arylsulfonic anhydride, and (ii) an inorganic phase comprising essentially sulfuric acid and invariably containing some unreacted chlorosulfonic acid. After removal of the solvent by simple distillation, the residual arylsulfonyl chloride (containing unreacted arylsulfonic acid and probably some arylsulfonic anhydride) from this organic phase is ready for use in the condensation reaction.

The Condensation Reaction

To produce aromatic sulfones in accordance with the process of the invention, the arylsulfonyl chloride is reacted with at least an equivalent amount (based on the amount of the arylsulfonyl chloride) of an arene, adding to the reaction mixture whatever additional arylsulfonic acid (which must structurally correspond to the particular arylsulfonyl chloride) may be required so that the aggregate amount of arylsulfonic acid present during the condensation reaction is equal to at least 50 mole percent of the amount of arylsulfonyl chloride present in the condensation reaction mixture. To achieve practically quantitative yields of aromatic sulfone (based on the arylsulfonyl chloride), at least equimolar amounts of arylsulfonic acid must be used, but this poses no difficulty since the arylsulfonic acid ultimately can be recovered and reused in the process. Excellent results have been achieved when the condensation reaction mixture is composed of approximately equimolar amounts of the arylsulfonyl chloride and the corresponding arylsulfonic acid. There is no particular advantage, however, in using more than four times an equimolar quantity of the arylsulfonic acid, based on the molar concentration of the arylsulfonyl chloride present in the reaction mixture. Because the presence of the arylsulfonic acid catalyzes the condensation reaction between the arylsulfonyl chloride and the arene, the reaction does not require any metal salts (such as aluminum chloride or comparable Lewis acids) as Friedel-Crafts catalysts; in fact, the presence of such metal salts would actually be completely superfluous in the process and would complicate the work-up recovery of the resultant aromatic sulfone.

Although the condensation reaction stoichiometrically requires equimolar amounts of the arylsulfonyl chloride and arene to form the corresponding aromatic sulfone (hydrogen chloride being formed as a byproduct of the reaction), certain advantages are obtained when a molar excess of the arene is used in the condensation reaction, since the arene generally is capable of functioning as a solvent for the resultant aromatic sulfone. As a general rule, no more than about 5 moles of arene per mole of arylsulfonyl chloride need be used in the condensation reaction mixture.

When the condensation reaction is conducted (i) in the presence of an aggregate amount of arylsulfonic acid at least equimolar in quantity to the amount of arylsulfonyl chloride present in the condensation reaction mixture, and (ii) substantially in the absence of any metal salts, the aromatic sulfone is formed in practically quantitative yields and may be easily recovered from the condensation reaction mixture without the usual work-up problems inherent in the use of Friedel-Crafts catalysts for such reaction, since the arylsulfonic acid may usually be extracted from the condensation reaction mixture with water, leaving the major amount of the aromatic sulfone produced in the condensation reaction dissolved in any excess arene used in the reaction mixture. To obtain maximum efficiency, the recovered arylsulfonic acid should, of course, be recycled back into the process, either to the chlorination reaction to produce arylsulfonyl chloride or into a subsequent condensation reaction. When properly engineered, the only raw materials which need be consumed in the manufacture of aromatic sulfones according to the process of the invention are arene and sulfur trioxide, since the chlorosulfonic acid may be produced by reacting the byproduct hydrogen chloride from the condensation reaction with sulfur trioxide.

The process of the invention may be used to produce any aromatic sulfone, whether a symmetrical or unsymmetrical sulfone, which either has been or normally may be prepared by the condensation of an arylsulfonyl chloride with an arene using Friedel-Crafts catalysts. If such aromatic sulfones have been or may be prepared from an arylsulfonyl chloride and an arene with Friedel-Crafts catalysts, then they may also be produced in much higher yields and with a minimum of work-up problems by the process of the invention without the use of any metal salt Friedel-Crafts catalysts.

PRODUCTION OF BIS-(P-CHLOROPHENYL) SULFONE

The applicability of the process of the invention to the production of bis-(p-chlorophenyl) sulfone is described below with reference to the accompanying flowsheet, which schematically illustrates an integrated, economically efficient process for the production of bis-(p-chlorophenyl) sulfone from monochlorobenzene:

p-chlorobenzenesulfonic acid, produced in a sulfonation reactor 1 by sulfonating monochlorobenzene with sulfuric acid, is reacted with an equimolar amount of chlorosulfonic acid at a temperature of 80° C. for one-half hour in a sulfonyl chloride reactor 2. To move the equilibrium of the chlorination reaction from about 66 percent to about 80 percent of the theoretical amount of p-chlorobenzenesulfonyl chloride, 250 ml. of perchloroethylene per gram-equivalent of p-chlorobenzenesulfonic acid is added to the sulfonyl chloride reactor 2 and the reaction mixture heated at a temperature of 80° C. for an additional hour, following which the chlorination reaction mixture is continuously discharged from the sulfonyl chloride reactor 2 into an extractor 3 containing the "heel" of a previously extracted batch. This "heel" comprises essentially sulfuric acid and small amounts of chlorosulfonic acid.

In the extractor 3, the chlorination reaction mixture separates into (i) an upper organic phase which is essentially a perchloroethylene solution of p-chlorobenzenesulfonyl chloride containing some unreacted p-chlorobenzenesulfonic acid and some unreacted chlorosulfonic acid, and (ii) a lower inorganic phase comprising essentially sulfuric acid and a minor amount of unreacted chlorosulfonic acid. Perchloroethylene is continuously introduced below the surface of the inorganic phase (the "heel") so that the sulfuric acid is continually being extracted with perchloroethylene which rises to the top of the extractor 3 where it enters and becomes part of the organic phase. Periodically, part of the sulfuric acid from the lower phase in the extractor 3 is recycled to the sulfonation reactor 1 for use in producing additional p-chlorobenzenesulfonic acid, the remainder of the sulfuric acid being discarded.

The upper organic phase (containing the perchloroethylene extraction of the lower sulfuric acid phase) in the extractor 3 continuously overflows into a distillation tower 4, where perchloroethylene is distilled off at a temperature of up to about 150° C. and the perchloroethylene distillate (containing codistilled chlorosulfonic acid which has been coextracted) recycled partly to the sulfonyl chloride reactor 2 and partly below the surface of the lower sulfuric acid phase in the extractor 3.

Assuming that a mole of p-chlorobenzenesulfonic acid was originally used in the sulfonyl chloride reactor 2, then the bottoms in the distillation tower 4 consist of about 0.8 mole of p-chlorobenzenesulfonyl chloride together with about 0.2 mole of p-chlorobenzenesulfonic acid and, in all probability, small amounts of p-chlorobenzenesulfonic anhydride which may form during the distillation of the perchloroethylene. The crude p-chlorobenzenesulfonyl chloride from the distillation tower 4 is transferred to a sulfone reactor 5 together with 1.25 moles of monochlorobenzene and 0.6 mole of p-chlorobenzenesulfonic acid (so that the p-chlorobenzenesulfonyl chloride and the p-chlorobenzenesulfonic acid are present in about equimolar quantities) and this reaction mixture is heated to a temperature in the range from about 140° C. to about 160° C. (and preferably in the range from 145° C. to 155° C.). As the monochlorobenzene is consumed in the condensation reaction, about 0.75 mole of additional monochlorobenzene is added to the sulfone reactor 5 at a rate sufficient to maintain a refluxing reaction mixture (ca. 155° C.).

After completion of the condensation reaction, which is signaled by the cessation of the hydrogen chloride evolution, the condensation reaction mixture from the sulfone reactor 5 is passed through a heat exchanger 6, where it is cooled to a temperature in the range from about 70° C. to about 100° C., into a separator 7 to which is added sufficient water and monochlorobenzene to effect a phase separation into (i) an upper aqueous phase containing substantially all of the p-chlorobenzenesulfonic acid present in the condensation reaction mixture as well as 0.06 mole of bis-(p-chlorophenyl) sulfone, and (ii) a lower monochlorobenzene phase containing 0.94 mole of bis-(p-chlorophenyl) sulfone based on 1 mole of p-chlorobenzenesulfonyl chloride.

Both phases may be decolorized with charcoal in the separator 7 and then separated, or the phases may be separated initially and the lower monochlorobenzene phase passed through a decolorizer unit 8 into a crystallizer 9 where 0.74 mole of chemically-pure grade bis-(p-chlorophenyl) sulfone crystallizes from the monochlorobenzene phase upon cooling to room temperature, leaving 0.2 mole of the sulfone in the mother liquors which can be recycled through the process or separately worked up.

The aqueous phase (if decolorized) may be cooled to crystallize out the 0.06 mole of bis-(p-chlorophenyl) sulfone. To obtain maximum process efficiency, the aqueous phase containing the p-chlorobenzenesulfonic acid is passed into an evaporator 10, where water is removed (azeotropically with monochlorobenzene if desired) and the residual p-chlorobenzenesulfonic acid is reused partly in the sulfonyl chloride reactor 2 and partly in the sulfone reactor 5.

Based on the foregoing process, practically quantitative yields of bis-(p-chlorophenyl) sulfone, m.p. 147°–149° C., may be produced more economically than by any other known process.

We claim:

1. In a process for the production of bis-(p-chlorophenyl)sulfone, in which p-chlorobenzenesulfonic acid is reacted with at least an equimolar amount of chlorosulfonic acid in a chlorination reaction to form a mixture of p-chlorobenzenesulfonic acid and p-chlorobenzenesulfonyl chloride, which p-chlorobenzenesulfonyl chloride, in turn, is reacted with monochlorobenzene to form bis-(p-chlorophenyl)sulfone in a condensation reaction, the improvement which comprises a. conducting the chlorination reaction in the presence of perchloroethylene;
b. completely extracting the p-chlorobenzenesulfonyl chloride from the chlorination reaction mixture into perchloroethylene while simultaneously and continuously maintaining a low concentration of p-chlorobenzenesulfonyl chloride in the solvent by introducing additional solvent, thereby displacing the equilibrium of the chlorination reaction toward formation of p-chlorobenzenesulfonyl chloride and minimizing the coextraction of p-chlorobenzenesulfonic acid and chlorosulfonic acid into the perchloroethylene;
c. codistilling substantially all of the perchloroethylene and chlorosulfonic acid from the resultant extraction mixture, leaving a residue comprising the p-chlorobenzenesulfonyl chloride and p-chlorobenzenesulfonic acid;
d. adding a sufficient amount of p-chlorobenzenesulfonic acid to said residue so that the aggregate amount of p-chlorobenzenesulfonic acid is at least about equimolar to the p-chlorobenzenesulfonyl chloride in said residue; and
e. conducting the condensation reaction by reacting at a temperature in the range from about 140° C. to about 160° C. the residue containing the p-chlorobenzenesulfonyl chloride and at least about an equimolar amount of p-chlorobenzenesulfonic acid with from about one to about five times the amount of monochlorobenzene stoichiometrically required to complete such condensation reaction, the condensation reaction being conducted substantially in the absence of any metal salts, thereby forming the bis-(p-chlorophenyl) sulfone and facilitating recovery of the sulfone from the resultant condensation reaction mixture.

2. A process for the production of bis-(p-chloro-phenyl)sulfone according to claim 1, in which a. the chlorination reaction mixture is allowed to separate in an extractor into (1) an organic phase comprising a solution of perchloroethylene of the p-chlorobenzenesulfonyl chloride and unreacted p-chlorobenzenesulfonic acid and unreacted chlorosulfonic acid, and (2) an inorganic phase comprising essentially sulfuric acid and some unreacted chloro-sulfonic acid;
b. the inorganic phase is extracted with perchloroethylene and the resultant solvent extraction is allowed to combine with the organic phase; and
c. the combined organic phase is removed from the extractor at approximately the same rate as perchloroethylene is introduced into the inorganic phase as an extractant, thereby completely extracting the p-chlorobenzenesulfonyl chloride formed by the chlorination reaction into the combined organic phase and minimizing the coextraction of p-chlorobenzenesulfonic acid and chlorosulfonic acid into the combined organic phase.

3. A process for the production of bis-(p-chlorophenyl)sulfone according to claim 2, in which the codistillate of perchloroethylene and chlorosulfonic acid is reused partly in the chlorination reaction and partly in the extraction of the inorganic phase produced by the chlorination reaction.

4. In a process for the production of bis-(p-chlorophenyl)sulfone, in which p-chlorobenzenesulfonic acid is reacted with at least an equimolar amount of chlorosulfonic acid in a chlorination reaction to form a mixture of p-chlorobenzenesulfonic acid and p-chlorobenzenesulfonyl chloride, which p-chlorobenzenesulfonyl chloride, in turn, is reacted with monochlorobenzene to form bis-(p-chlorophenyl)sulfone in a condensation reaction, the improvement which comprises a. conducting the chlorination reaction in the presence of a halogenated hydrocarbon solvent characterized by being (i) inert to chlorosulfonic acid and sulfuric acid, (ii) a nonsolvent for and immiscible with sulfuric acid, (iii) a solvent for p-chlorobenzenesulfonyl chloride, and (iv) a very limited solvent for the p-chlorobenzenesulfonic acid and for chlorosulfonic acid;
b. completely extracting the p-chlorobenzenesulfonyl chloride from the chlorination reaction mixture into the halogenated hydrocarbon solvent while simultaneously and continuously maintaining a low concentration of p-chlorobenzenesulfonyl chloride in the solvent by introducing additional solvent, thereby displacing the equilibrium of the chlorination reaction toward formation of the p-chlorobenzenesulfonyl chloride and minimizing the coextraction of p-chlorobenzenesulfonic acid and chlorosulfonic acid into said solvent;
c. codistilling substantially all of the halogenated hydrocarbon solvent and chlorosulfonic acid from the resultant extraction mixture, leaving a residue comprising the p-chlorobenzenesulfonyl chloride and p-chlorobenzenesulfonic acid;
d. adding a sufficient amount of p-chlorobenzenesulfonic acid to said residue so that the aggregate amount of p-chlorobenzenesulfonic acid is at least about equimolar to the p-chlorobenzenesulfonyl chloride in said residue; and
e. conducting the condensation reaction by reacting at a temperature in the range from about 140° C. to about 160° C. the residue containing the p-chlorobenzenesulfonyl chloride and at least about an equimolar amount of p-chlorobenzenesulfonic acid with from about one to about five times the amount of monochlorobenzene stoichiometrically required to complete such condensation reaction, the condensation reaction being conducted substantially in the absence of any metal salts, thereby forming the bis-(p-chlorophenyl)sulfone and facilitating recovery of the sulfone from the resultant condensation reaction mixture.

5. A process for the production of bis-(p-chlorophenyl)sulfone according to claim 4, in which a. the chlorination reaction mixture is allowed to separate in an extractor into (1) an organic phase comprising p-chlorobenzenesulfonyl chloride and unreacted p-chlorobenzenesulfonic acid and unreacted chlorosulfonic acid, and (2) an inorganic phase comprising essentially sulfuric acid and some unreacted chlorosulfonic acid;
b. the inorganic phase is extracted with the halogenated hydrocarbon solvent and the resultant solvent extraction is allowed to combine with the organic phase; and
c. the combined organic phase is removed from the extractor at approximately the same rate as the halogenated hydrocarbon solvent is introduced into the inorganic phase as an extractant, thereby completely extracting the p-chlorobenzenesulfonyl chloride formed by the chlorination reaction into the combined organic phase and minimizing the coextraction of p-chlorobenzenesulfonic acid and chlorosulfonic acid into the combined organic phase.

* * * * *

PO-1050
(5/69)

UNITED STATES PATENT OFFICE
CERTIFICATE OF CORRECTION

Patent No. 3,673,259  Dated June 29, 1972

Inventor(s) Jacob Rosin and Frank S. Ang

It is certified that error appears in the above-identified patent and that said Letters Patent are hereby corrected as shown below:

Column 7, lines 49-50 "a solution of perchloroethylene" should read --a solution in perchloroethylene--.

Column 8, line 58 "and the resultant solvent extraction" should read --and the resultant solvent extract--.

Signed and sealed this 26th day of December 1972.

(SEAL)
Attest:

EDWARD M. FLETCHER, JR.
Attesting Officer

ROBERT GOTTSCHALK
Commissioner of Patents